(12) United States Patent
Verdrager et al.

(10) Patent No.: US 6,757,462 B2
(45) Date of Patent: Jun. 29, 2004

(54) BRAGG GRATING FILTER OPTICAL WAVEGUIDE DEVICE

(75) Inventors: Véronique Verdrager, Gif-sur-Yvette (FR); Jean-Jacques Guerin, Massy (FR); Isabelle Riant, Orsay (FR)

(73) Assignee: Avanex Corporation, Fremont, CA (US)

( * ) Notice: Subject to any disclaimer, the term of this patent is extended or adjusted under 35 U.S.C. 154(b) by 16 days.

(21) Appl. No.: 10/115,253

(22) Filed: Apr. 4, 2002

(65) Prior Publication Data

US 2002/0168141 A1 Nov. 14, 2002

(30) Foreign Application Priority Data

Apr. 9, 2001 (EP) .............................. 01440099

(51) Int. Cl.⁷ ................................ G02B 6/34
(52) U.S. Cl. .................... 385/37; 385/10; 385/137; 385/123; 372/102
(58) Field of Search ............................ 385/10, 37, 137, 385/12, 39, 123; 372/102, 25

(56) References Cited

U.S. PATENT DOCUMENTS

| 4,725,110 | A |   | 2/1988  | Glenn et al. |
| 5,007,705 | A | * | 4/1991  | Morey et al. ............... 385/12 |
| 5,602,949 | A |   | 2/1997  | Epworth |
| 5,636,304 | A | * | 6/1997  | Mizrahi et al. ............... 385/37 |
| 5,694,501 | A |   | 12/1997 | Alavie et al. |
| 5,717,799 | A | * | 2/1998  | Robinson ..................... 385/37 |
| 5,982,963 | A |   | 11/1999 | Feng et al. |
| 6,275,629 | B1 | * | 8/2001  | Eggleton et al. ............... 385/37 |
| 6,282,340 | B1 | * | 8/2001  | Nasu et al. ................... 385/37 |
| 6,381,069 | B1 | * | 4/2002  | Riant et al. ................. 359/569 |
| 6,493,486 | B1 | * | 12/2002 | Chen .......................... 385/37 |

FOREIGN PATENT DOCUMENTS

| EP | 0 730 172 A1   | 9/1996 |
| WO | WO 00/54082 A1 | 9/2000 |

OTHER PUBLICATIONS

R.M. Measures, et al..: "Controlled Grating Chirp for Variable Optical Dispersion Compensation" 13ᵗʰ Annual Conference on European Fibre Optic Communications and Networks, Brighton, England, 1995, p. 38–41.

* cited by examiner

*Primary Examiner*—Phan T. H. Palmer
(74) *Attorney, Agent, or Firm*—Kenta Suzue; Wilson Sonsini Goodrich & Rosati

(57) ABSTRACT

The present invention relates to a Bragg grating filter optical waveguide device, comprising an optical fiber provided with a Bragg grating region which is externally strained to alter the range of chirping. The external strain is induced by a gradient-generating mechanical body bonded onto the length of the fiber grating.

22 Claims, 5 Drawing Sheets

PRIOR ART

Fig. 5a
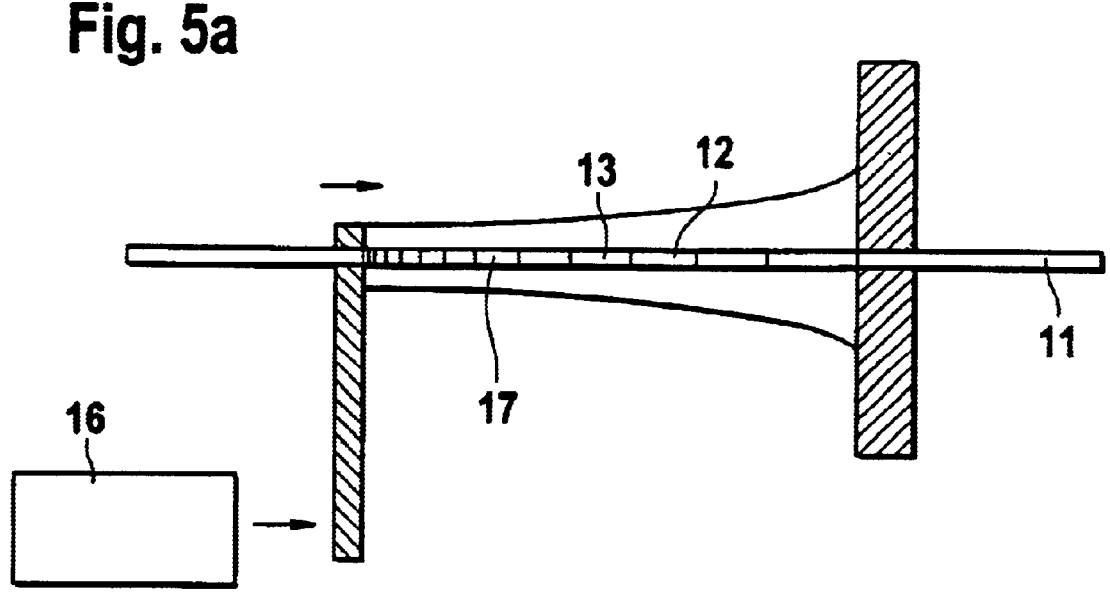
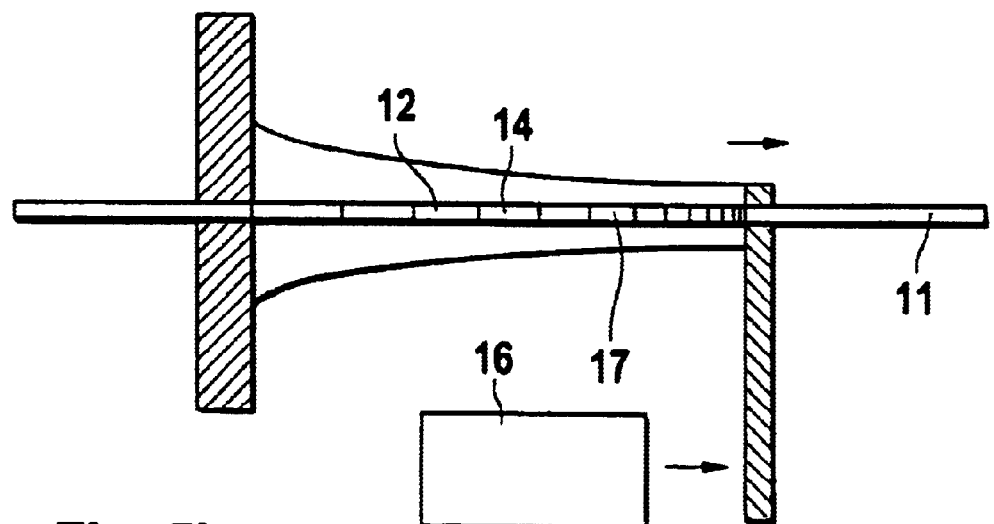
Fig. 5b

BRAGG GRATING FILTER OPTICAL WAVEGUIDE DEVICE

BACKGROUND OF THE INVENTION

The present invention relates to a Bragg Grating Filter Optical Waveguide Device.

Optical filters have numerous applications in optical communications and in particular, they can be used for providing wavelength selectivity and tuning in WDM and DWDM systems. For this purpose, filters based on Bragg grating structures offer near ideal filter response, and high channel isolation. Bragg grating structures are also used for compensating the optical dispersion experienced by short optical pulses traversing a length of an optical fiber.

In a fiber Bragg grating a spectral component of a wavelength $\lambda$ in the input signal is reflected back at position x when the wavelength $\lambda$, the grating period $\Lambda(x)$ and the effective index $n(x)$ satisfy a Bragg phase-matching condition: $\lambda=2n(x)\Lambda(x)$. Different spectral components of different wavelengths are reflected at different locations and have different phase delays. For instance, when the fiber has a constant effective index of refraction $n=n(x)$ and a linearly chirped grating period $\Lambda(x)$, the phase-matched wavelength changes with the position x according to $\Lambda(x)$ only. The variation of $\Lambda$ according to the position x is called chirp of the grating. In a linearly chirped grating, the period $\Lambda$ of the grating varies according to a $\Lambda(x)=ax+b$ law.

Figure 1:
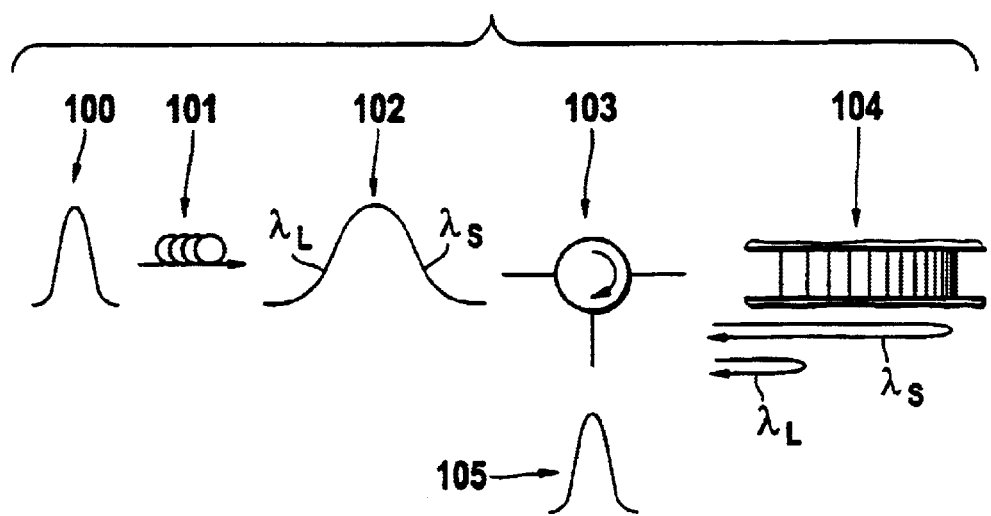

FIG. 1 shows an example for the use of a chirped Bragg grating for compensating the dispersion of a signal. An initial pulse 100 is transmitted over an optical fiber line 101.

A pulse carrying information is never perfectly monochromatic. Pulse broadening arises from transmission in dispersive fibers as the high frequencies of the impulsion spectrum travel faster than the lower frequencies. As a result the pulse 102 is much broader than the initial pulse 100. In the first approximation the frequency distribution is linear along the pulse.

The grating 104 introduces a delay depending on the wavelength of the incoming pulse which is fed in with help of an optical circulator 103. Higher wavelengths $\lambda_L$ are reflected at the rear end, whereas shorter wavelengths $\lambda_S$ are reflected at the far end. Thus, the shorter wavelengths travel farther within the grating and thereby experience an additional time delay with respect to the longer wavelength. In order to compensate for the linear frequency distribution along the pulse, the grating has to be linearly chirped.

The request for compensating dispersion broadening is to compress pulse width. For dispersion effects in fiber lines depend on a different parameters and on the time it is necessary to adapt the compression function of a Bragg fiber grating to this system parameters.

A dispersion tunable structure with no central wavelength shift has been proposed by R. M. Measures et. al. in $13^{th}$ Ann. Conf. Europ. Fibre Optic Comm. Networks 1995, p. 38–41. This allows to control the intra-grating strain distribution by means of a tapered cantilever beam which allows the variation and control of the chirp of a Bragg grating to be varied in a precise manner over a wide range of dispersion without any shift in the grating's center wavelength. The disadvantage of this solution results in undesirable stress induced birefringence causing a high polarization mode dispersion (PMD) because the exerted strain coupled to the fiber is nonsymmetrical.

Another problem of the disclosed solution is that the bending of this device is controlled by a micrometer translator which is slow to react an fast dispersion changes.

The underlying problem of the invention is therefore to provide a Bragg grating filter optical waveguide device which allows the tuning of the dispersion of a fiber Bragg grating in a due time frame.

SUMMARY OF THE INVENTION

A first preferable solution of this problem is a Bragg grating filter optical waveguide device which comprises a first area, a second area and a third intermediate area corresponding to the central wavelength, wherein adjusting means are provided for compressing the fiber grating between said first and said intermediate area and for elongating the fiber grating between said intermediate and said second area.

Adjusting means are designed in order to induce a linear strain along the grating. This strain along the grating is half a compression and half an elongation, and the central wavelength undergoes no change as no strain is applied at this position.

The term "adjusting means" refers to any means capable of changing the chirp and therefore the dispersion of a Bragg grating associated with a determined central wavelength by exerting stress and/or strain to the grating.

The first preferable solution comprises an optical fiber provided with a linearly chirped Bragg grating. Then the adjusting means compresses the Bragg grating where the grating periods are the shortest and elongates the Bragg grating where the periods are the longest. The shorter the grating period, the higher the compression, and the longer the grating period, the stronger the elongation. When such a linear strain is applied along a linearly chirped Bragg grating, the final chirp of the grating is still linear. Moreover, the chirp, that is to say the difference between the maximum and the minimum period of the grating will increase. Therefore, the dispersion which is approximately inversely proportional to the chirp in the case of a linearly chirped Bragg grating will decrease. A non-chirped or non-linearly chirped Bragg grating can also be deformed in the same manner in order to alter the dispersion.

Preferably, the longer grating periods area is arranged in upstream direction of the shorter grating periods area with respect to the signal transmission pathway. This leads to a linearly chirped grating which compensates the linear frequency distribution along a given pulse without shifting the central wavelength of the pulse.

Advantageously, the fiber grating compression is linear. This linearity allows to match the linear chirp of the Bragg grating region, because the chirp of the fiber is directly proportional to the deformation of the grating.

In an advantageous embodiment, the fiber compression and fiber elongation have essentially identical values. Thereby, the total transverse strain is essentially compensated.

A preferable holder comprises a fiber guide which is shaped in a circular or an elliptic form.

A second solution comprises an optical fiber provided with a linearly chirped Bragg grating. The adjusting means generates a linear mechanical gradient when compressed or elongated. If the adjusting means is compressed, the Bragg grating is compressed the most where the grating periods are the shortest and compressed the least where the periods are the longest. The shorter the grating period, the higher the compression, and the longer the grating period, the weaker the compression. If the adjusting means is elongated, then the Bragg grating is elongated the most where the grating periods are the longest and elongated the least where the periods are the shortest. The shorter the grating period, the weaker the elongation, and the longer the grating period, the stronger the elongation. When such a linear strain is applied along a linearly chirped Bragg grating, the final chirp of the grating is still linear. Moreover, the chirp, that is to say the difference between the maximum and the minimum period of the grating will change. Therefore, the dispersion will also change. A non-chirped or non-linearly chirped Bragg grating can also be deformed in the same manner in order to change the dispersion.

A preferred solution of this linear mechanical gradient generating ajusting means is a flat conical holder as described in the following drawings. The linearly chirped, non-chirped or non-linearly chirped Bragg grating is bonded onto this mechanical structure. Applying stress or strain on this ajusting means induces a linear chirp in the fiber Bragg grating.

Further advantages of the present invention are explained in the following drawings.

It is understood that the aforementioned advantages and the features of the invention explained in the following, are not only used in the specifically described combination, but can also be used by a person skilled in the art in other combinations or alone, without exceeding the scope of the invention.

DESCRIPTION

The invention is schematically explained in the figures and is described in detail, where reference is made to the drawing.

FIG. 1: schematic dispersion compensation (prior art)

Figure 2:
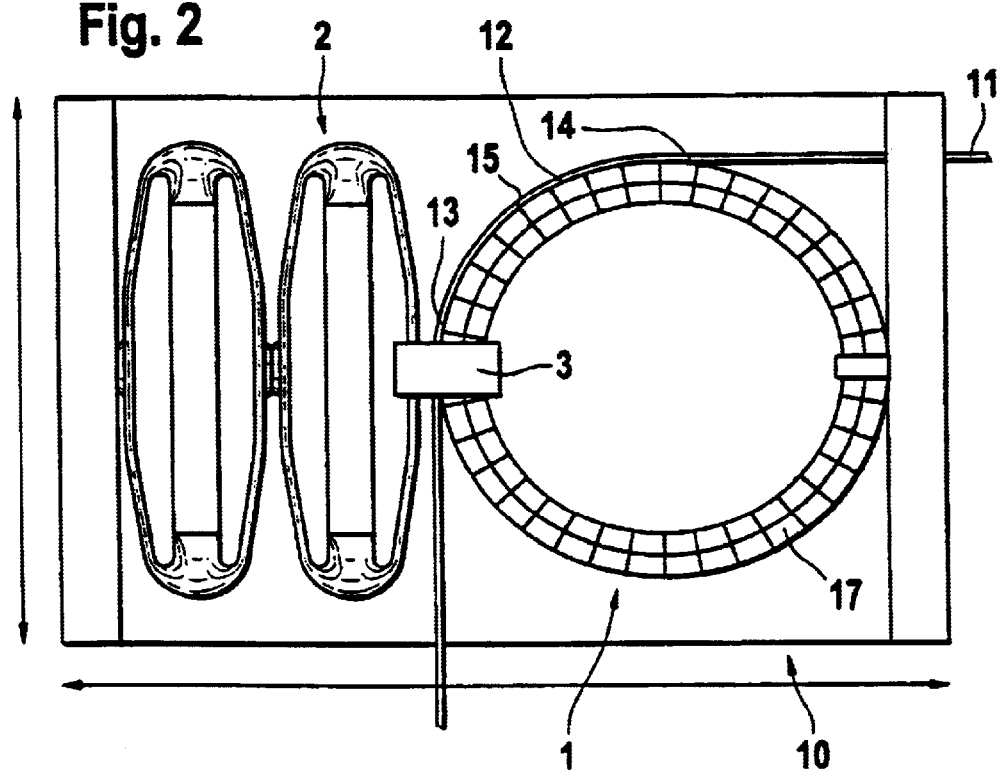

FIG. 2: First example of the device

Figure 3:
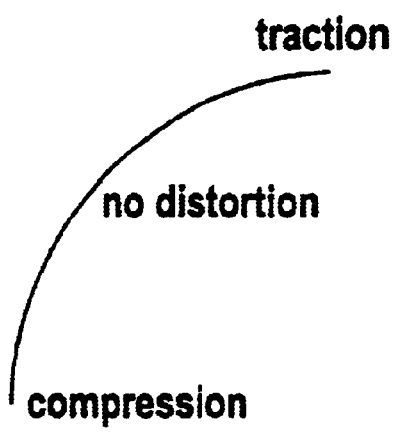

FIG. 3 schematic structure of compression and traction

Figure 4:
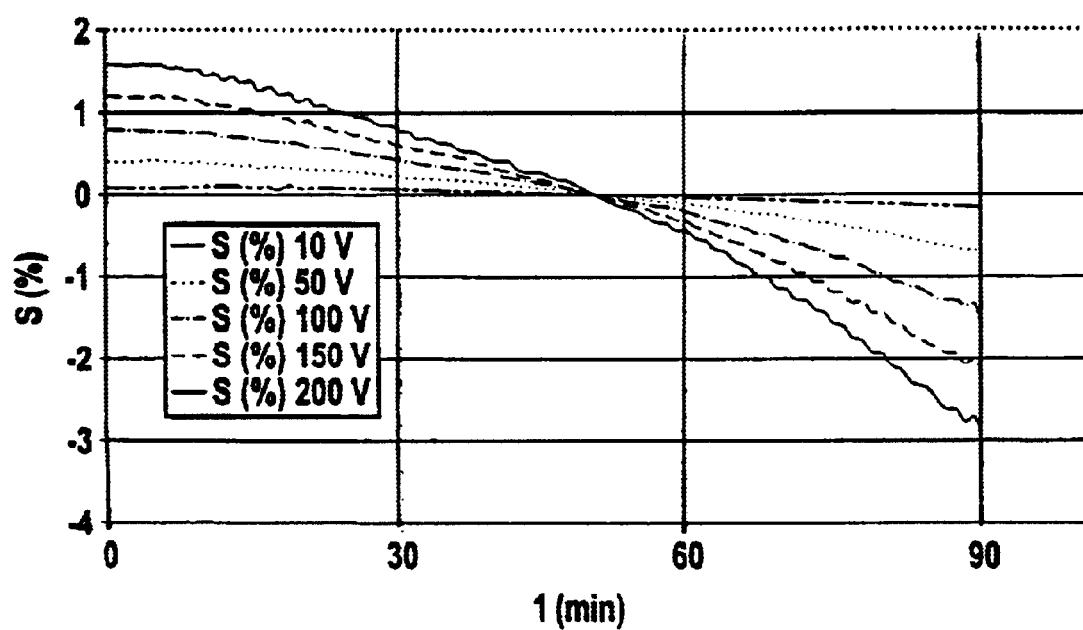

FIG. 4: Deformation measurement

FIGS. 5a and 5b: second example for the device according to the invention.

Figure 6:
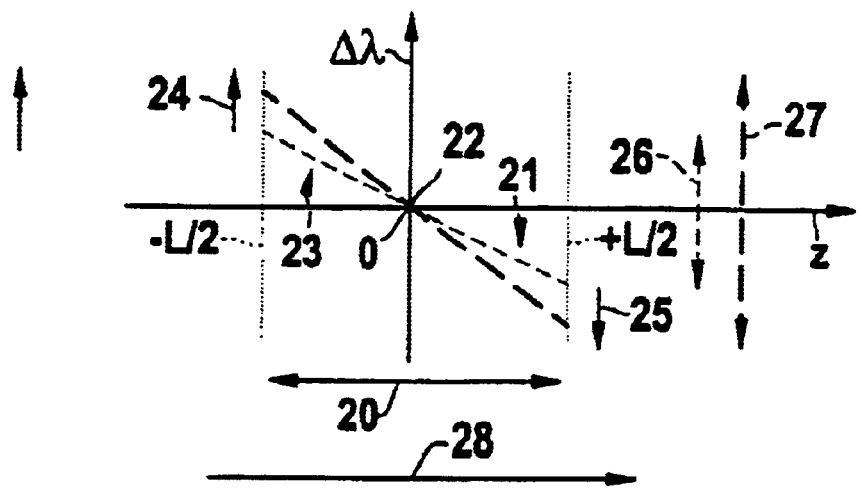

FIG. 6 schematically shows the influence of compression and elongation on the wavelength shift of a Bragg grating region according to the invention.

Figure 7:
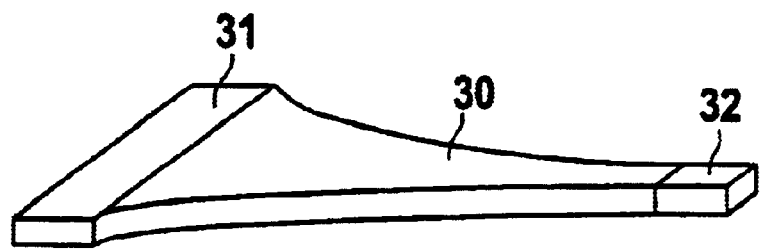

FIG. 7: example of shape for the second solution of the invention

Figure 8:
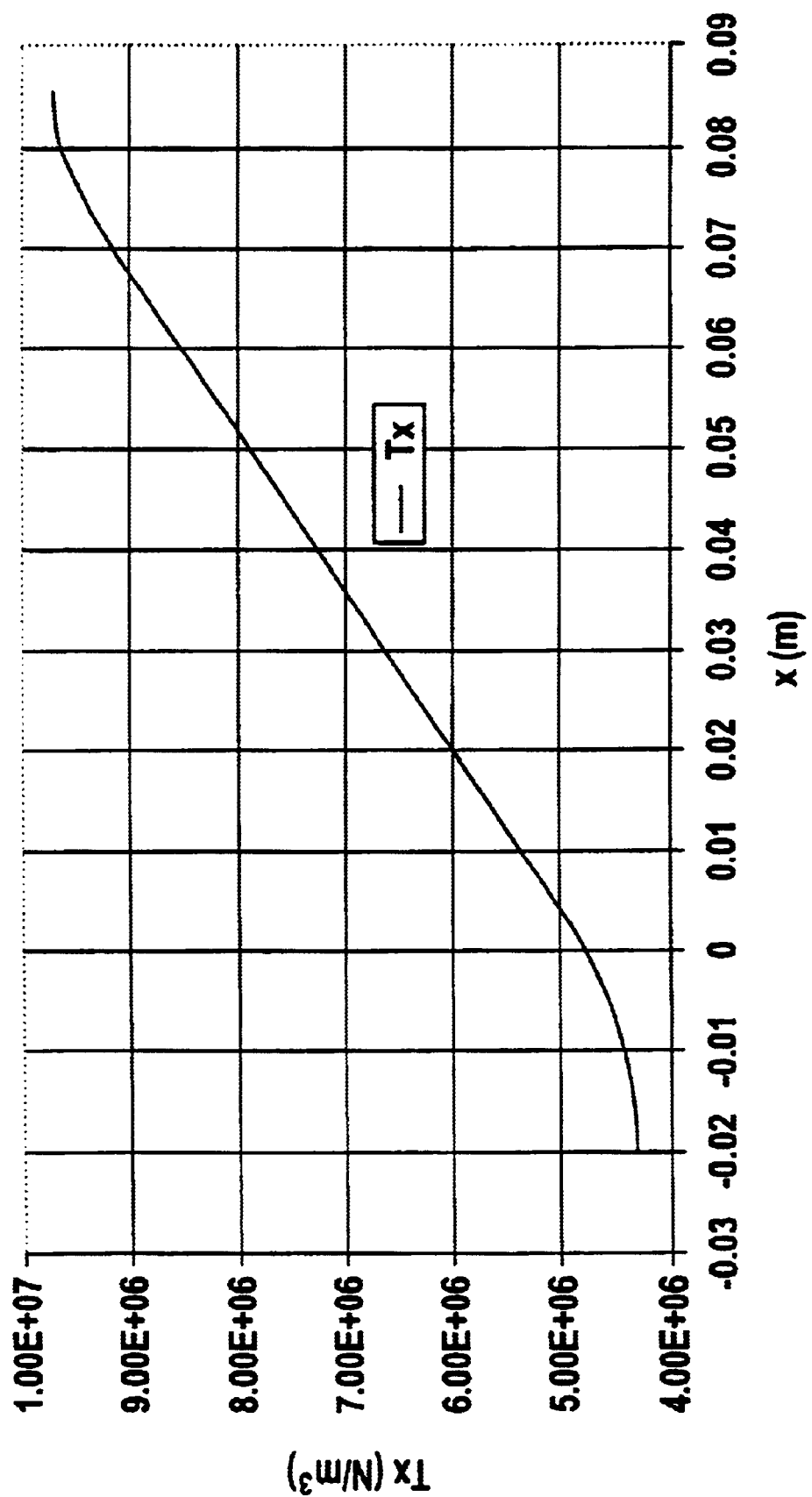

FIG. 8: Deformation measurement

The Bragg grating of the Bragg grating region 12 is formed by any method known by a person skilled in the art, as for example disclosed in U.S. Pat. No. 4,725,110 or in EP 0 730 172 A1.

FIG. 2 shows one embodiment of the invention. The device 10 comprises a fiber guide 1 arranged in a holder structure 17. The fiber guide—in this example a circular shaped guide—is connected with a piezo electrical actuator over a connecting device 3. The fiber 11 is guided from the fiber guide 1. The fiber comprised a piece of fiber Bragg grating 12. We define three areas of this fiber: a first area 13, a second area 14 and an intermediate area 15.

The fiber Bragg grating 12 is in one embodiment a uniform fiber grating and in another embodiment a linearly or non-linearly chirped fiber grating. The fiber is fixed on a quarter of the circle in a groove to avoid the fiber to slip laterally. The fiber is glued on the fiber guide 1 to better fix it for deformation.

The circular guide 1 is deformed by the actuator 2 and the fixed fiber with it. FIG. 4 shows the result of a deformation. One part of the structure 13 undergoes compression whereas the other end 14 of the structure undergoes traction. In the middle of the structure exists a point 15 which remains undisturbed.

The use of a piezo electrical actuator allows a response time smaller than 1 ms. The displacement and hence the deformation of the grating is proportional to the tension applied with unlimited resolution. The power consumption for maintaining the position of the actuator is very low.

Another embodiment of the invention is described in FIGS. 5a and 5b. The fiber 11 is arranged in a holder 17 to which adjusting means 16, for example piezoelectric actuators are connected. Other adjusting means comprise micrometer translators. Preferably the piezoelectric actuator 16 is a multilayer piezoelectric element and transfers its tension or compression to the fiber 11 via means which are known by a person skilled in the art. This piezoelectric element exerts compression strain on the grating of the area 13 in FIG. 5a and traction strain on the area 14 FIG. 5b.

The whole setup as described above is referenced to the term "packaging".

In a further embodiment also covered by the scope of the invention, the packaging may include further adjusting means, for example arranged on other parts of the optical fiber.

The fiber Bragg grating 12 is a uniform fiber grating or a linearly or non-linearly chirped fiber grating.

For the first solution of the invention related to FIG. 2 we define three areas in Bragg grating region 12:

The first area 13 where the grating periods are the shortest is arranged in upstream direction of the second area 14 where the grating periods are the longest and a central area 15 associated to the central wavelength is arranged between the first and the second area. The second area 14 has a high grating period in the range of 350 to 650 nm, preferably in the range of 450 to 580 nm and most preferably in the range of 500 to 550 nm. A most advantageous value in a preferred embodiment is for example in the range 535 to 540 nm. An exemplary value may therefore be 535.15 nm for the maximum grating period of this continuously chirped area. The first area 13 has lower grating periods than the second area 14. As an example the minimum grating period of the first area is for example 534.85 nm. The grating period varies continuously and linearly from the minimum grating period of the first area to the maximal grating period of the second area.

For the second solution of the invention related to FIGS. 5a and 5b the areas 13 or 14 have a grating period in the range of 350 to 650 nm, preferably in the range of 450 to 580 nm and most preferably in the range of 500 to 550 nm. A most advantageous value in a preferred embodiment is for example in the range 530 to 540 nm. The grating period can be uniform, or varies linearly or non-linearly from the minimum grating period of the area to the maximal grating period of the area.

Compression, applied on a Bragg grating region shortens the grating most where the grating period is the shortest. The center of the Bragg grating undergoes no variation in length. By contrast, traction elongates the Bragg grating most, where the period is the largest. The variation of the period of a grating is proportional to the fiber elongation and the chirp of the grating can be changed by applying a force by adjusting means which are, for example, a piezo actuator. Other adjusting means, like the above-mentioned micrometer translators, which can apply traction and compression known to a person skilled in the art are also within the scope of the invention. The dispersion of the fiber can also be changed as it is inversely proportional to the chirp of the grating.

In another embodiment, the arrangement of the first and second area of the first solution are inverted, so that the second area 14 with the higher grating periods is now in upstream direction with regard to the signal transmission pathway and the first area 13 with the lower grating periods is now arranged in downstream direction.

It is understood that this arrangement of subsequent areas with different grating periods leads to a linear distribution of the wavelengths of the chirped Bragg grating region. The linear distribution is achieved in stepwise intervals, or, preferably, in a continuous way. The so obtained linearity of the chirp in the Bragg grating region is most advantageous, because a signal, i.e. a pulse which is carrying information, is never perfectly monochromatic. Only in a first approximation, the frequency distribution is linear along a given pulse. Pulse broadening occurs due to transmission in dispersive fibers as the high frequencies of the pulse spectrum travel faster than the lower frequencies.

A grating introduces a delay, i.e. a broader pulse, depending on the wavelength of the incoming pulse. Longer wavelengths $\lambda_L$ are reflected in the Bragg grating region at the area with a higher period and shorter wavelengths $\lambda_S$ at the area with a lower grating period. In the case, that the shorter grating periods are downstream and the longer grating periods are upstream with regard to the incoming pulse, i.e. the signal transmission pathway, the shorter wavelength travels further within the grating, thereby experiencing an additional time delay with respect to the longer wavelength. This applies by analogy also in the other case, when the shorter and longer grating periods are arranged in an inverted manner.

If the grating is used in a reflection mode, an optical circulator, essentially known by a person skilled in the art, is used in order to obtain a recompensed pulse.

FIG. 6 visualizes the influence of compression and elongation on the wavelength shift of a chirped Bragg grating region 20. The chirped Bragg grating region 20 with a defined length L comprises three areas 21, 22 and 23 with different grating periods according to the first solution of the invention, wherein area 21 has the lower periods, area 23 the higher periods and area 22 the central grating period. The signal transmission pathway, i.e. the pulse direction is represented by arrow 28. The chirp of the Bragg grating region 20 is linear and represented by arrow 26. Another embodiment comprises an inverted arrangement of the three areas 21, 22 and 23 with respect to the pulse direction. The longitudinal axis of the fiber with the Bragg grating region 20 is represented by the letter z. Arrow 25 represents compression applied at the longitudinal axis area 21 and arrow 24 elongation or traction applied at the longitudinal axis of area 20. The resulting wavelength change of the chirp of the Bragg grating region is represented by line 27. As can be seen, the grating period of area 21 is changed by applying compression most, while the grating period of area 23 is changed most by applying traction. The grating period of the intermediate area 22 remains essentially unchanged. As is also evident from FIG. 2, the magnitudes of the compression and elongation induced change in the grating periods have essentially identical values and compensate each other. This leads to a compensation of the total transverse strain and induces a low birefringence, leading to a low PMD.

The behavior of the grating applies by analogy also in the case of the second solution of the invention, FIG. 5a corresponding to the region 21 and FIG. 5b to the region 23.

The size of the adjusting means and the force to apply is calculated according to the size and the chirp of a specific Bragg grating region. This is shown in an exemplary manner, making reference to FIG. 2. In the following, numerals and letters have the meaning as follows:

z: position along the fiber
$\epsilon_z$: strain along the longitudinal axis of the fiber
$\sigma_z$: stress along the longitudinal axis of the fiber
E: modulus of elasticity (Young)
L: length (before loading)
$\Delta L$: length variation
$\lambda$: wavelength (before loading)
$\Delta\lambda$: wavelength variation
F: force
$p_e$: Photoelastic coefficient
whereby:

$$F=\sigma_z S, \text{ with } \sigma_z>0 \text{ is traction and } \sigma_z<0 \text{ is compression}$$

The strain along the longitudinal axis of the fiber is:

$$\epsilon_z=\Delta L/L=\sigma_z/E$$

The wavelength shift of the bragg grating is:

$$\Delta\lambda/\lambda=(1-p_e)\epsilon_z$$

The induced wavelength variation is linear.
So has to be the strain $\epsilon_z$ along the ajusting means:

$$\epsilon_z=a.z+b$$

The stress $\sigma_z$ along the axis z is related to the strain $\epsilon$ by the Hooke law:

$$\sigma_z=E.\epsilon_z$$

with E the modulus of elasticity (Young) of the material.

In the second solution of the invention, if we consider for instance a plate which has a constant thickness e and a width y(z), which is fixed at one extremity and subject to a force F at the other extremity then:

$$\sigma_z=F/(y(z).e)$$

The profile of the plate y(z) is then:

$$y(z)=F/(e.E.(az+b))=1/(\alpha z+\beta)$$

This leads to the shape 30 of the plate represented on FIG. 7. Modelling shows that right connections 31 and 32 have to be added to the plate in order to reduce strain nonlinearities at the extremities. A modelling of the stress along the z axis of the plate is shown in FIG. 8.

The conical holder can also be designed with a revolution symetry instead of a flat shape.

This allows to control and to tune the chirp of a Bragg grating in facile manner and can be applied to any Bragg grating region as explained in the foregoing.

What is claimed is:

1. A Bragg grating filter optical waveguide device, comprising:
   an optical fiber provided with a fiber Bragg grating region having a first area, a second area and a third intermediate area corresponding to a central wavelength, and
   adjusting means for simultaneously compressing the fiber Bragg grating region between said first area and said intermediate area and elongating the fiber Bragg grating region between said intermediate area and said second area.

2. The Bragg grating filter optical waveguide device according to claim 1, wherein the fiber grating is uniformly, linearly or non-linearly chirped.

3. The Bragg grating filter optical waveguide device according to claim 2, comprising a holder with a fiber guide where the fiber is fixed by fixing means.

4. The Bragg grating filter optical waveguide device according to claim 3, wherein the fiber guide has a circular shape.

5. The Bragg grating filter optical waveguide device according to claim 3, wherein the fiber guide has an elliptical shape.

6. The Bragg grating filter optical wave guide device according to claim 1, wherein a grating period of said fiber Bragg grating region varies continuously from a minimum grating period of the first area to a maximal grating period of the second area.

7. The Bragg grating filter optical waveguide device according to claim 6, wherein said grating period of said fiber Bragg grating region varies linearly.

8. The Bragg grating filter optical waveguide device according to claim 1, wherein the magnitude of the fiber compression and fiber elongation have essentially identical values.

9. The Bragg grating filter optical waveguide device according to claim 1, wherein at least one of the first and second areas has a grating period in the range of 350 to 650 nm.

10. The Bragg grating filter optical waveguide device according to claim 1, wherein at least one of the first and second areas has a grating period in the range of 450 to 580 nm.

11. The Bragg grating filter optical waveguide device according to claim 1, wherein at least one of the first and second areas has a grating period in the range of 500 to 550 nm.

12. The Bragg grating filter optical waveguide device according to claim 1, wherein at least one of the first and second areas has a grating period in the range of 530 to 540 nm.

13. The Bragg grating filter optical waveguide device according to claim 1, wherein the first area has lower grating periods than the second area.

14. The Bragg grating filter optical waveguide device according to claim 1, wherein the first area is arranged in an upstream direction of the second area with respect to a signal transmission pathway.

15. The Bragg grating filter optical waveguide device according to claim 1, wherein the fiber elongation is linear.

16. The Bragg grating filter optical waveguide device according to claim 1, wherein the second area has a grating period in the range of 535 to 540 nm.

17. The Bragg grating filter optical waveguide device according to claim 1, wherein said adjusting means comprises at least one of a piezoelectric actuator and/or at least one of a micrometer translator.

18. The Bragg grating filter optical waveguide device according to claim 1, wherein grating periods within said first area are shorter than grating periods in said second area, and wherein said first area is arranged in an upstream direction from said second area.

19. The Bragg grating filter optical waveguide device according to claim 1, wherein said second area has higher grating periods than said first area, and wherein said second area is located upstream from said first area.

20. The Bragg grating filter optical waveguide device according to claim 1, wherein said adjusting means does not change said central wavelength.

21. A Bragg grating filter optical waveguide device, comprising:

an optical fiber provided with a fiber Bragg grating region having a first area, a second area and an intermediate area;

an adjuster coupled to said optical fiber which simultaneously compresses the fiber Bragg grating region between said first area and said intermediate area and elongates the fiber Bragg grating region between said intermediate area and said second area; and a holder having a fiber guide to which said optical fiber is where the fiber is secured.

22. The Bragg grating filter optical waveguide device of claim 21, wherein said intermediate area corresponds to a central wavelength and wherein said adjuster does not change said central wavelength.

* * * * *